(12) United States Patent
Yang (10) Patent No.: US 8,140,772 B1
(45) Date of Patent: Mar. 20, 2012

(54) SYSTEM AND METHOD FOR MAINTAINING REDUNDANT STORAGES COHERENT USING SLIDING WINDOWS OF EAGER EXECUTION TRANSACTIONS

(75) Inventor: Qing K. Yang, Saunderstown, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 563 days.

(21) Appl. No.: 12/262,260

(22) Filed: Oct. 31, 2008

Related U.S. Application Data (60) Provisional application No. 60/985,759, filed on Nov. 6, 2007.

(51) Int. Cl.
*G06F 15/167* (2006.01)
*G06F 12/00* (2006.01)
(52) U.S. Cl. ......... 711/141; 709/216; 711/112; 711/162
(58) Field of Classification Search ................... 709/216; 711/112, 141, 162
See application file for complete search history.

(56) References Cited

U.S. PATENT DOCUMENTS

| | | | |
|---|---|---|---|
| 7,017,012 B2 * | 3/2006 | Clarke et al. | 711/141 |
| 2003/0236950 A1 * | 12/2003 | Clarke et al. | 711/144 |
| 2006/0031450 A1 | 2/2006 | Unrau et al. | |
| 2006/0136685 A1 * | 6/2006 | Griv et al. | 711/162 |

OTHER PUBLICATIONS

Silicon Graphics, Inc. and Yotayota, "Global Block Services for the GRID, A New Architecture from SGI and YotaYota" Computational Methods in Science and Technology, Nov. 2005, p. 75-85, Special Issue 2006.

Reidel, Eric, Spence, Susan, Veitch, Alistair, "When Local Becomes Global: An Application Study of Data Consistency in a Networked World" Proc. of the 20th IEEE Int'l Performance, Computing, and Communication Conference, (IPCC2001), Apr. 2001, 6 pgs.

Keeton, Kimberly, Santos, Cipriano, Beyer, Dirk, Chase, Jeffrey, Wilkes, John, "Designing for Disasters" Hewlett-Packard Laboratories, 2004 14pgs.

(Continued)

*Primary Examiner* — Kevin Ellis
*Assistant Examiner* — Mehdi Namazi
(74) *Attorney, Agent, or Firm* — Gesmer Updegrove LLP (57) ABSTRACT

A system and method are disclosed for maintaining a plurality of data storages coherent with one another for redundancy purposes. The system includes a first data storage system and a second data storage system. The first data storage system is coupled to a first transaction processor for handling input and output transactions, and is coupled to a wide area network. The second data storage system is coupled to a second transaction processor for handling input and output transactions, and is coupled to the wide area network. The first transaction processor permits a first data write transaction to occur with respect to data within the first data storage system, and the second transaction processor permits a second data write transaction to occur with respect to data within the second data storage system. The first transaction processor permits the second data write transaction to occur with respect to data within the first data storage system only upon data consistency between the first and second data storage systems being validated. The second transaction processor permits the first data write transaction to occur with respect to data within the second data storage system only upon data consistency between the first and second data storage systems being validated.

17 Claims, 4 Drawing Sheets

OTHER PUBLICATIONS

Patterson, David, "A New Focus for a New Century: Availability and Maintainability >> Performance" in FAST Keynote, Jan. 2002, www.cs.berkeley.edu/~patterson/talks/keynote.html, 61 pgs.

Zhang, Ming, Liu, Yinan, Yang, Qing, "Cost-Effective Remote Mirroring Using the iSCSI Protocol" Apr. 2004, pp. 385-398.

Ji, Minwen, Veitch, Alistair, Wilkes, John, "Seneca: Remote Mirroring Done Write" Jun. 2003, pp. 253-268.

Susarla, Sai and Carter, John, "Flexible Consistency for Wide Area Peer Replication" Jun. 2005, pp. 199-208.

Muthitacharoen, Athicha, Morris, Robert, Gil, Thomer M., Chen, Benjie, "Ivy: A Read/Write Peer-to-Peer File System" MIT Laboratory for Computer Science, Dec. 2002, 14 pgs.

Petersen, Karin, Spreitzer, Mike J., Terry, Douglas B., Theimer, Marvin M., Demers, Alan J., "Flexible Update Propagation for Weakly Consistent Replication" France, 1997, pp. 288-301.

Cox, Landon P., and Noble, Brian D., "Fast Reconciliations in Fluid Replication" University of Michigan, Apr. 2001, pp. 449-458.

Yu, Haifeng and Vahdat, Amin, "Design and Evaluation of a Continuous Consistency Model for Replicated Services" Duke University, 2000, 14 pgs.

Herlihy, Maurice and Moss, J. Eliot B., "Transactional Memory: Architectural Support for Lock-Free Data Structures" May 1993 12 pgs.

Moore, Kevin E., Bobba, Jayaram, Moravan, Michelle J., Hill, Mark D. and Wood, David A., "LogTM: Log-based Transactional Memory" Feb. 2006 12 pgs.

Ananian, C. Scott, Kuszmaul, Bradley C., Leiserson, Charles E. and Lie, Sean, "Unbounded Transactional Memory" Massachusetts Institute of Technology, 12 pgs.

Kung, H.T. and Robinson, John T., "On Optimistic Methods for Concurrency Control" ACM Transactions on Database Systems, vol. 6, No. 2, Jun. 1981, pp. 213-226.

Amiri, Khalil, Gibson, Garth, A. and Golding, Richard, "Highly Concurrent Shared Storage" In Proceedings of the International Conference on Distributed Computing Systems, Taipei, Apr. 2000, 10 pgs.

Sears, Russell and Brewer, Eric, "Stasis: Flexible Transactional Storage" University of California, Berkeley, 2006, 16 pgs.

Vilayannur, Murali, Nath, Partho and Sivasubramaniam, Anand, "Providing Tunable Consistency for a Parallel File Storage" Pennsylvania State University, Dec. 2005, 14 pgs.

Yang, Qing, Xiao, Weijun and Ren, Jin, "Trap-Array: A Disk Array Architecture Providing Timely Recovery to Any Point-in-Time" University of Rhode Island, Jun. 2006, 12 pgs.

\* cited by examiner

SYSTEM AND METHOD FOR MAINTAINING REDUNDANT STORAGES COHERENT USING SLIDING WINDOWS OF EAGER EXECUTION TRANSACTIONS

PRIORITY

The present application claims priority to U.S. Provisional Patent Application Ser. No. 60/985,759 filed Nov. 6, 2007.

GOVERNMENT RIGHTS

This invention was made with government support under contract number CCR-0312613, awarded by the National Science Foundation. The government has certain rights to this invention.

BACKGROUND

Many conventional data centers are protected using geographically remote backup data centers with data replication. The backup data centers are not being used except for disaster recovery or testing/auditing for recoverability of the backup data centers. As a result, less than 50% of investment on data centers is being utilized giving rise to very low ROI (Return on Investment). Furthermore, because the backup data centers are not being used, it is very costly and time consuming to test and audit their recoverability. It may take hours or days to recover and continue business in case of a failure of primary site giving rise to high RTO (recovery time objective).

An ideal deployment of the data centers, the primary data center and the backup data centers, would be to make all centers active serving inputs and outputs (I/Os) from production servers concurrently to achieve high ROI, load balancing, and low RTO (Recovery Time Objective). The challenge to such active-active data centers, however, is the long communication latency between the data centers. For multiple data centers that are tens or hundreds of miles apart, the latency is in the range of tens and up to hundreds of milliseconds. Keeping the data coherent between the multiple centers may significantly reduce the application performance.

The most effective and commonly accepted technique to minimize latency is caching, which has been successfully used in computer processing unit (CPU), file system, network, and data storage systems. Certain prior art techniques seek to provide unified global data images across wide area networks by means of coherence caches. A directory based invalidation cache coherence protocol at block level has also been used. While such technologies may solve many existing data sharing issues, they are not suitable for active/active data centers because of the following reasons. First, an invalidation protocol always invalidates other data copies upon a write operation. As a result, any change on a data block effectively eliminates the redundancy that is necessary for data protection and disaster recovery. Second, WAN latency directly impacts the application performance drastically because every write operation to a data block that may reside at other storages creates several network operations to keep cache coherence. Such a write stalls the I/O operations even though the data at a remote site is not being accessed at that moment.

Reliable data storage is essential in today's information age. Recent research has shown that data loss or data unavailability may cost up to millions of dollars per hour in many businesses. Solely depending on the traditional time-consuming backups is no longer adequate for today's information age. To protect data from disastrous failures, data replications are generally implemented over WAN networks. Examples of such systems include remote data mirroring (as disclosed in *Cost-Effective Remote Mirroring Using the iSCSI Protocol*, by M. Zhang, Y. Liu and Q. Yang, $21^{st}$ IEEE Conference on Mass Storage Systems and Technologies, April 2004, pp. 385-398) and replication (as disclosed in *Seneca: Remote Mirroring Done Write*, by M. Ji, A. Veitch and J. Wilkes, Proc. of the USENIX Technical Conference, June 2003, pp. 253-268), each of which employs replicas to ensure high data reliability with data redundancy. A minor data center, however, is not an active data storage, and failover is costly and time consuming. It also typically requires considerable time to recover data in the case of failure (large RTO). Recovery Performance Objective (RPO) is also large for asynchronous mirroring. Further, it is typically costly and time consuming to comply with auditing requirements. Long WAN latency also leads to performance suffering for synchronous mirroring.

Replicating mutable data in a P2P (Peer to Peer) environment poses unique challenge to keep data coherence. In *Flexible Consistency for Wide Area Peer Replication*, $25^{th}$ IEEE International Conference on Distributed Computing Systems, (ICDCS 2005), June 2005, pp. 199-208, S. Susarla and J. Carter surveyed a variety of WAN data sharing applications and identified three broad classes of applications: (1) file access, (2) database and directory services, and (3) real-time collaborative group-ware. Based on their survey, a new consistency model was developed to boost the performance of P2P data sharing. The impact of keeping data coherence on the performance of data sharing in P2P environment has also been reviewed, for example, in *Ivy: A Read/Write Peer-to-Peer File System*, by A. Muthitacharoen, R. Morris, T. M. Gil and B. Chen, Proc. of $5^{th}$ Symposium on Operating Systems Design and Implementation (OSDI 2002), December 2002; *Flexible Update Propagation for Weakly Consistent Replication*, by K. Peterson, M. J. Spreitzer and D. B. Terry, Proc. of the $16^{th}$ ACM Symposium on Operating System Principles, 1997, pp. 288-301; *Fast Reconciliations in Fluid Replication*, by L. Cox and B. Noble, Proceedings of the $21^{st}$ International Conference on Distributed Computing Systems, April 2001; and *Design and Evaluation of a Continuous Consistency Model for Replicated Services*, by H. Yu and A. Vandat, Proc. of the $4^{th}$ Symposium on Operating Systems Design and Implementations, 2000. Such analyses, however, are not targeted to data protection and disaster recovery of block level data storages.

Transactional memory and transactional storage have recently become active research areas. A principle advantage of transactional memory is avoiding unnecessary locking in case of data sharing. See, for example, *Transactional Memory: Architectural Support for Lock-Free Data Structures*, by M. P. Herlihy and J. E. B. Moss, Proceedings of the 1993 International Symposium on Computer Architecture, May 1993; *LogTM: Log-Based Transactional Memory*, by K. E. Moore, J. Bobba, M. J. Moravan, M. D. Hill and D. A. Wood, International Symposium on High Performance Computer Architecture, February 2006; and *Unbounded Transactional Memory*, by C. Scott, A. Krste, A. Bradley, C. Kuszmaul, C. E. Leiserson and S. Lie, http://supertech.csail.mit.edu/papers/xaction.pdf. The basic premise is based on the idea of optimistic concurrency control in databases as disclosed, for example, in *On Optimistic Methods for Concurrency Control*, by H. T. Kung and J. T. Robinson, ACM Transaction on Database Systems, Vol. 6, No. 2, June 1981, pp. 213-226.

Transactional storage concepts have also been studied to ensure serializability and correctness of multiple low level device I/Os (see *Highly Concurrent Shared Storages*, by K. Amiri, G. A. Gibson and R. Golding, Proc. of the International Conference on Distributed Computing Systems, April 2000) as well as file system integrity (see Statis: Flexible Transaction Storage, by R. Sears and E. Brewer, Proc. of Operating System Design and Implementation, 2006 and *Providing Tuneable Consistency for a Parallel File Storage*, by M. Vilayannur, P. Nath, and A. Sivasubramaniam, Proc. of the USENIX Symposium on File and Storage Technologies, December 2005).

There remains a need, however, for systems and method for employing backup data centers as active data storage serving I/O requests of servers. There is a further need to provide data coherence of storages at block level across WAN networks, and to allow active-to-active data sharing over redundant data across long distance. Not only must correctness of the underlying transactional storages be ensured, but excessive network latency must also be hidden while keeping data coherent.

SUMMARY

In accordance with an embodiment, the invention provides a system for maintaining a plurality of data storages coherent with one another for redundancy purposes. The system includes a first data storage system and a second data storage system. The first data storage system is coupled to a first transaction processor for handling input and output transactions, and is coupled to a wide area network. The second data storage system is coupled to a second transaction processor for handling input and output transactions, and is coupled to the wide area network. The first transaction processor permits a first data write transaction to occur with respect to data within the first data storage system, and the second transaction processor permits a second data write transaction to occur with respect to data within the second data storage system. The first transaction processor permits the second data write transaction to occur with respect to data within the first data storage system only upon data consistency between the first and second data storage systems being validated. The second transaction processor permits the first data write transaction to occur with respect to data within the second data storage system only upon data consistency between the first and second data storage systems being validated.

In accordance with another embodiment, the invention provides a method of maintaining a plurality of data storages coherent with one another for redundancy purposes. The method includes the steps of maintaining a first set of data within a first data storage system that is coupled to a wide area network; maintaining a second set of data within a second data storage system that is coupled to the wide area network; permitting a first data write transaction to occur with respect to data within the first data storage system; permitting a second data write transaction to occur with respect to data within the second data storage system; executing the second data write transaction with respect to data within the first data storage system only upon data consistency between the first and second data storage systems being validated; and executing the first data write transaction with respect to data within the second data storage system only upon data consistency between the first and second data storage systems being validated.

In accordance with a further embodiment, the invention provides the method includes the steps of maintaining a first set of data within a first data storage system that is coupled to a first transaction processor for handling input and output transactions, and is coupled to a wide area network; maintaining a second set of data within a second data storage system that is coupled to a second transaction processor for handling input and output transactions, and is coupled to the wide area network; permitting a first window of first data write operations to occur with respect to data within the first data storage system; permitting a second window of second data write operations to occur with respect to data within the second data storage system; executing the second data write operations with respect to data within the first data storage system only upon data consistency between the first and second data storage systems being validated; executing the first data write operations with respect to data within the second data storage system only upon data consistency between the first and second data storage systems being validated; re-defining the first window of first data write operations to include a third set of data write operations with respect to data within the first data storage system when the second transaction processor permits the first data write operations to occur with respect to data within the second data storage system; and re-defining the second window of second data write operations to include a fourth set of data write operations with respect to data within the second data storage system when the first transaction processor permits the second data write operations to occur with respect to data within the first data storage system.

BRIEF DESCRIPTION OF THE DRAWINGS

The following description may be further understood with reference to the accompanying drawings in which.

The drawings are shown for illustrative purposes only.

DETAILED DESCRIPTION

A new paradigm of data storage architecture across redundant data centers are proposed herein that are geographically separated over a wide area network (WAN). Each data center has a number of servers and data storages such as disk array storage (DAS), network attached storage (NAS) or storage area networks (SAN). All servers see a coherent data image presented by the storages residing at multiple data centers. Data storages at the data centers are all active, serving I/Os from the servers concurrently and simultaneously. The data stored at the multiple data centers are mirrored data and are kept coherent. The data coherence across multiple storages is maintained using a novel coherence protocol referred to as Sliding Window of Eager Execution Transactions, or SWEET for short.

A principle idea of SWEET protocol is allowing eager execution of I/O operations while coherence traffic is in progress on a long latency WAN. Such eager execution will effectively hide the WAN latency giving rise to high I/O performance. A sliding window with tunable size contains I/O operations that initiated coherence traffic because of possible conflict or race conditions between the storages. A set of I/Os inside the window are considered as a transaction that could commit or abort depending on the outcome of coherence operations. An important feature of the coherence protocol is that an update protocol is used in contrast to existing technologies that use invalidate-coherence protocol. The update coherence protocol allows mirrored storages to have the freshest data that is coherent. The SWEET protocol delivers high performance, high reliability, and fast recoverability in case of site failure by exploiting the data locality property that is either the result of inherent properties of real world applications or the result of configuration and policy settings of the storages. It also makes it trivial for auditing or testing the recoverability of mission critical data because all storages are actively working during production time.

Systems and methods of certain embodiments of the invention, therefore, provide an update-based coherence protocol wherein remote data is updated upon a write as opposed to invalidate, and data redundancy is maintained all of the time. Such systems provide two storages that are actively served by I/O sources from different servers with a unified global data image. Failover, audit and recovery are facilitated since both storages are working for production. High performance is provided due to load balancing and parallel storage accesses. Systems and methods of certain embodiments also provide eager execution of inputs and outputs inside a sliding window, which effectively hides WAN latency, ensures correctness by using transactions that commit or abort as an ACID entity, and provide graceful roll back in case of rare conflict events.

Systems and methods of certain embodiments of the invention provide great practical value for enterprise storages for high data availability, reliability, efficiency, and recoverability. At the same time, enterprise ROI is greatly improved by increasing the utilization of consolidated storages. Data storage architectures of certain embodiments makes high performance, coherent and active/active data centers possible.

The idea is to implement an efficient and update-based data coherence protocol between the storages at multiple data centers by allowing eager execution of I/Os while data coherence is being resolved. A configurable window is maintained at each storage site that contains eagerly executed I/Os. Within the window there are at least two checkpoints that mark the data consistent points from upper layer applications such as file systems or databases. All I/Os are defined between two consecutive checkpoints inside a window as a transaction that exhibits atomicity, consistency, isolation and durability (ACID) properties. A transaction commits when consistency is validated and the window slides down to allow more eager execution of I/O transactions.

A basic premise of the SWEET protocol is that conflicts between two concurrent transactions at the two storage sites are rare so that majority of I/O transactions commit quickly without dragging down the application performance. Prior research and experiments have shown that percentage of shared data block accesses varies depending on applications. Within a small window of time less than 10 seconds, such sharing is well less than 4%. Within 2 seconds of inter-requests time, less than 1% of I/O accesses are shared block accesses. Such high data locality provides a great opportunity to implement SWEET protocol efficiently. SWEET protocol allows 99% of I/O operations to go as fast as possible by eliminating the negative impact of cache coherence protocol overheads. For the rare case of conflicts, SWEET protocol maintains coherence data at multiple storages by ensuring ACID property of transactions in the sliding windows.

Preliminary experiments have been conducted by implementing block updating and remote replication at block level using iSCS1 protocol. Measurement results using TPC-C benchmark running Postgres databases and analytical performance evaluation have shown great performance potential of the storage architecture of certain embodiments. Compared to invalidate-based cache coherence protocol, SWEET protocol has the potential to provide orders of magnitude improvement in terms of I/O throughputs in addition to the obvious advantage of continued data redundancy provided the redundant storage systems.

The redundant storage architecture and SWEET coherence protocol are detailed below with reference to an illustrative example that shows only a special case of two centers. The proposed architecture is more general and may be employed in systems with many data centers.

Figure 1:
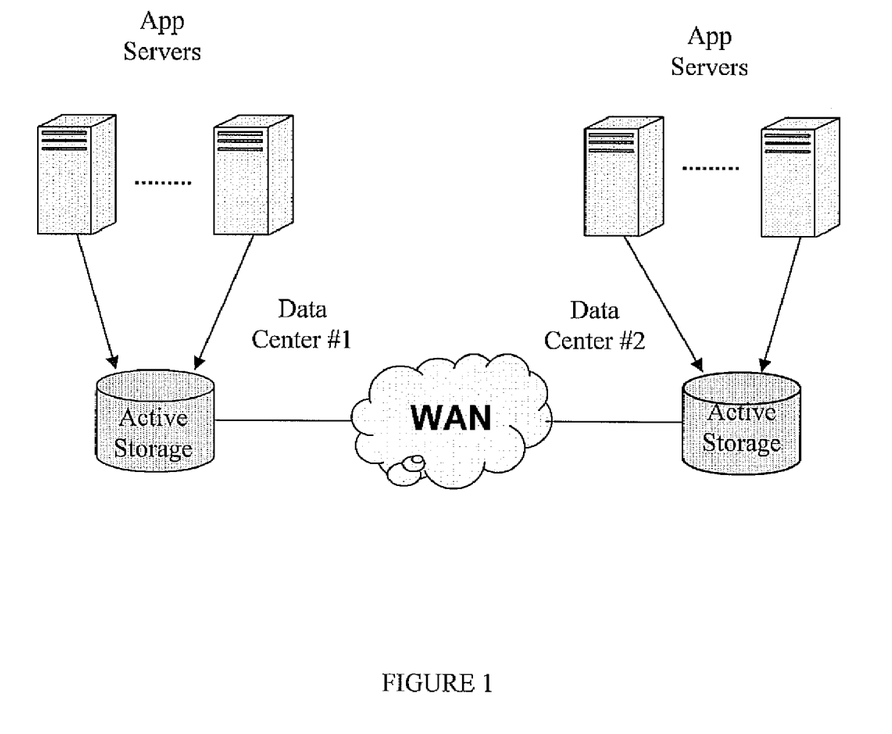
FIG. 1 shows an illustrative diagrammatic view of a redundant storage system with which a system of the invention may be employed.

FIG. 1 shows the block diagram of two data centers over a wide area network (WAN) that has long communication latency in the range of tens and hundreds of milliseconds. In particular, the system 10 includes application servers 12 and 14 that are coupled to an active storage 16 at a data center #1, and application servers 20 and 22 that are coupled to an active storage 24 at a data center #2. The active storages 16 and 24 are each coupled to a WAN 18 as shown.

Each data center has numerous application servers (two are shown for illustrative purposes) performing read/write I/Os on the data storage at the data center. The two redundant storages at the two data centers are mirrored and provide all application servers with a global and coherent data image at block level. Both storages are actively serving read/write I/Os concurrently. For read I/Os, concurrent I/O operations at the two centers may be performed safely. For write I/Os, data coherence has to be enforced. The objective here is to design an efficient coherence protocol between the two storages to ensure correctness of concurrent I/O operations at the two storages. The resulting two centers should be coherent and active/active redundant storages.

A key to the effectiveness and correctness of the redundant storage systems is the sliding window of eagerly executed transactions (SWEET) coherence protocol of the present invention. With the SWEET protocol, instead of handling coherence operations for each I/O synchronously, SWEET allows a window of I/Os to be eagerly executed while coherence operations are in progress. Such eager executions optimize I/O performance by relying on a roll back mechanism, hoping that there will be no conflicts within the window. To ensure data are consistent at both storages, a transaction is defined within a window as a finite sequence of I/Os between two consecutive check points that mark the data consistent points from applications such as a database and a file system. A transaction satisfies the following properties: 1) Serializibility: Transactions at both storages appear to execute serially, i.e. both storages sees the same order of executions of transactions. 2) Atomicity: A transaction either commits, if no conflict, that makes all write I/Os in the transaction visible to both storages permanently, or aborts, if a conflict is detected, that rolls back causing its write I/Os to be discarded.

There may be one or a few transactions within a window. While the transactions are being eagerly executed, coherence enforcement is done in background. As soon as a transaction is validated to have no conflict with the other storage, the transaction commits and the window slides down to the next transaction. The window is therefore referred to as a sliding window.

Since a transaction is defined to be I/Os between two consecutive checkpoints, a sliding window begins with a checkpoint and contains a set of read/write I/Os interleaved by possibly several checkpoints. The number of operations in the sliding window is one less than the number of checkpoints in the window. As I/O operations are being served and coherence operations proceed, the beginning of the window slides down the stream of I/O operations to the next may finally commit or abort depending on the coherence operations with the remote site.

The principle merit of SWEET protocol is fast commit at the cost of abort that is assumed to be rare because of small percentage of conflicts. In order to deal with the rare conflict events, a micro snapshot is maintained to allow rollback in case of transaction abort. The micro snapshot keeps copy-on-write data in the current sliding window. Upon transaction commit, the corresponding portion of the micro snapshot is simply flushed. Upon transaction abort, data are restored from the micro snapshot. As a result, commit is much faster than abort since abort must undo the transaction by writing old values back to their appropriate locations.

The coherence protocol employed herein is an update-based protocol as opposed invalidate-based protocol that has been used in existing technologies. The primary advantage of update protocol is its preservation of data redundancy between the two storages for high reliability and availability. To make such updated protocol feasible, an innovative updating technology was used based on the methodology disclosed in *TRAP-Array: A Disk Array Architecture Providing Timely Recovery to Any Point-in-Time*, by Q. Yang, W. Xiao and J. Ren, Proc. 33$^{rd}$ Annual International Symposium on Computer Architecture, 2006, the disclosure of which is hereby incorporated by reference. When a write operation is performed, a log of parities in the micro snapshots is maintained. The changed parity is also used to update remote data copies. Sending just the parities to update remote copies reduces the amount of data traffic by two orders of magnitude.

Figure 2:
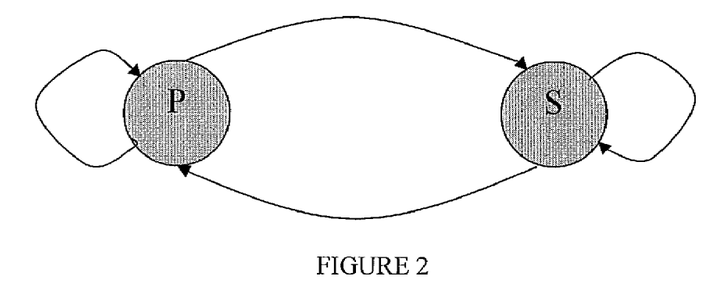
FIG. 2 shows an illustrative diagrammatic view of a state change diagram for data in one of two states in a system in accordance with an embodiment of the invention.

The high level logic of the SWEET protocol is outlined below. In general and with reference to FIG. 2, each data block is assigned to one of two states, P for primary state (as shown at 30), and S for secondary state (as shown at 32). Four different operations are then defined: local read ($R_L$), local write ($W_L$), remote read ($R_R$) and remote write ($W_R$). As shown at 34, state P remains unchanged with a $R_L$ or $W_L$ remote update. As shown at 36, state P changes to state S with a $W_R$ local update. As shown at 38, state S remains unchanged with a $R_L$ or $W_R$ remote update. As shown at 39, state S changes to state P with a $W_L$ remote update.

Each storage maintains a configurable-size window. All I/Os inside the window are eagerly executed but not committed. The window starts with a checkpoint, wherein checkpoint indicates a consistent point. All I/Os between two consecutive checkpoints are defined as a transaction satisfying ACID property. The window slides down to the next checkpoint when the previous transaction is ready to commit.

A micro-snapshot stores copy-on-write data of the current window. Since I/Os are eagerly executed, old values of the affected I/Os are kept. When a transaction commits, the micro-Snapshot is flushed accordingly. When a transaction aborts, the micro-snapshot is restored. The system provides fast commit at the cost of slow abort, hoping aborts are rare events.

A remove log maintains update requests from the remote storage. All remote updates are kept here until the remote transaction commits Each data block is in one of the following states: P_C: primary cached, S_C: secondary cached, P: primary non-cached, and S: secondary non-cached.

The I/O Operations seen by a storage are: 1) local read of a block, from the local server; 2) local write to a block, from the local server; 3) checkpoint: marking the consistent point viewed from application, DB, FS etc, from the local server; request for ownership from the remote site: S→P request; and 4) update request for a (S) block from the remote site that has the block in P state.

Certain definitions of terms are also helpful in understanding the system. First, a transaction is defined as a set of I/O operations between any two consecutive checkpoints. It must satisfy ACID properties: atomicity, consistency, isolation, and durability.

Second, a sliding window begins with a checkpoint and contains a set of I/O operations, reads or writes, from local servers and at least two checkpoints including the first checkpoint. As I/O operations being served, the beginning of the window slides down the stream of I/O operations to the next checkpoint. All I/O operations in the window are eagerly executed but not committed. They may finally commit or abort depending on the coherence operations with the remote site.

Third, a check point is said mature if there is a third checkpoint in the sliding window and all of the I/O operations between the first checkpoint and the second checkpoint in the window are ready to commit.

Fourth, a window slides down to begin at the second checkpoint and to end at an I/O operation after the third checkpoint whenever the first checkpoint is mature.

The LogBuffer #1 data structure stores micro snapshots for local I/O operations. Each entry should have a state indicating the status such as waiting for update acknowledge, grant of ownership etc. The LogBuffer #2 data structure stores update data resulting from remote update operations that are not yet committed.

The commit condition buffer stores needed acknowledges and grants after the third checkpoints are in the sliding window but the first check point is yet to be mature. The conflict/Race event log data structure indicates the condition where the two sliding windows at the two sites have interleaved conflicts, i.e., a window contains at least a P block and an S block, and both of which are in the window of the remote site in S and P states, respectively.

Figure 3:
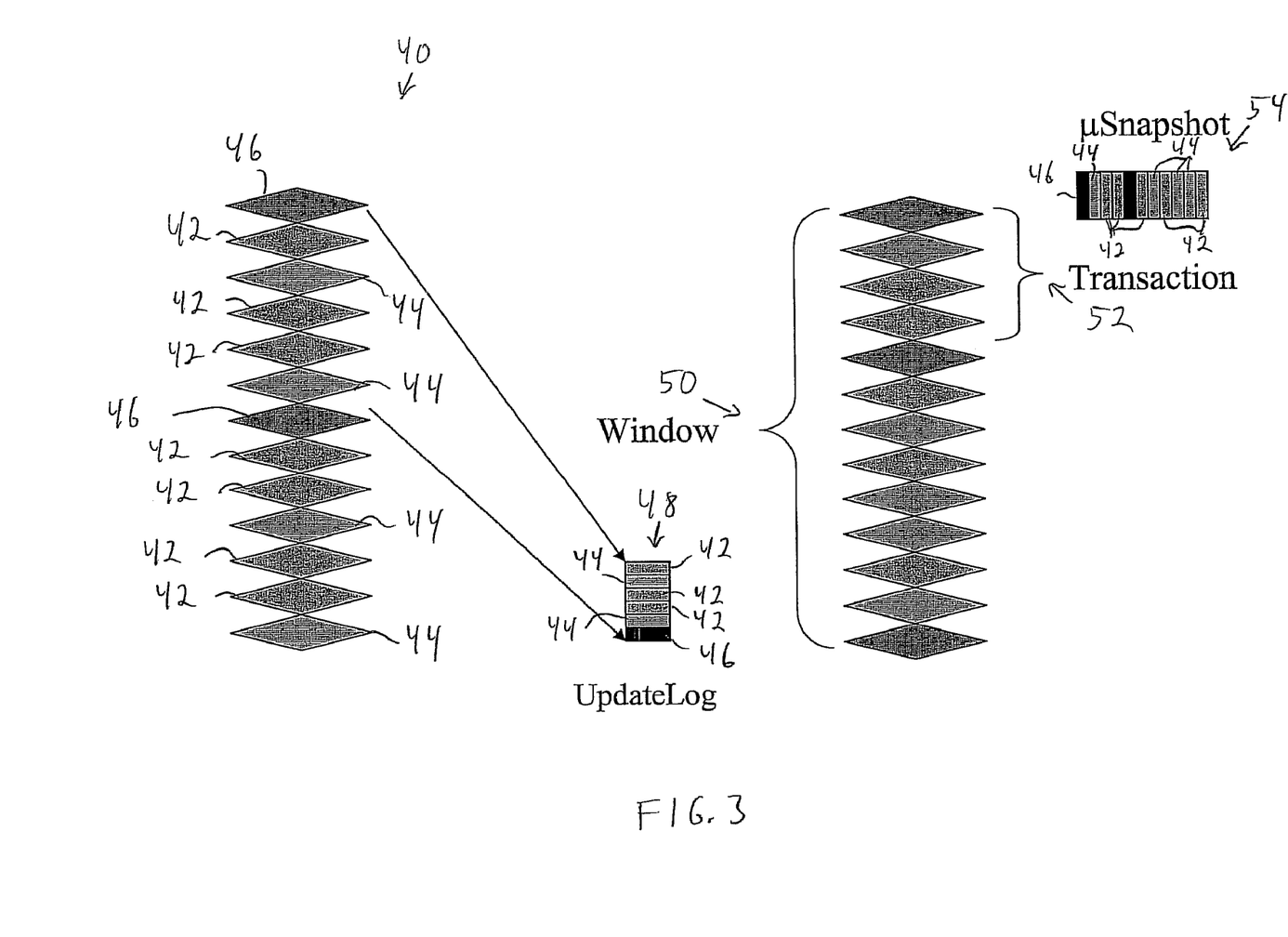
FIG. 3 shows an illustrative diagrammatic view of a sliding window of eager executions in a system in accordance with an embodiment of the invention.

As shown in FIG. 3, a set of transactions 40 may include write I/O actions 42 and read I/O actions 44, as well as checkpoints 46. An update log 48 is maintained of the current set of actions between the current checkpoints 46. A current window 50 may be defined as including actions between two or more checkpoints 46, and a transaction 52 is defined as including actions between the top two checkpoints. A micro-snapshot 54 includes actions from the top action down to a determined number of actions, e.g., six beyond the second checkpoint.

The specific steps of a SWEET Protocol of an example of the invention may be as follows. When the storage sees a check point, it starts a sliding window by allocating 2 log buffers, the first buffer stores a snapshot using copy-on-write for subsequent I/O operations and the second buffer stores update data caused by remote updates. A local read on a block causes return data and journals the read operation in the window. A local write to a block is handled differently depending on whether the block is in P state or S state. If the block is in P state, then 1) the write proceeds in place, 2) old data is maintained in the log buffer #1 and a flag is set waiting for an acknowledge, and 3) an update request is generated to the remote storage.

If the block is in S state, then the log buffer #2 is checked. If there is a match in the log buffer #2, I/O operations are stalled until a commit signal from the remote site is received. If there is no match, 1) the write proceeds in place, 2) old data is kept in the log buffer #1 (i.e., copy on write), 3) a request is sent for ownership to the remove site along with the new data, and 4) a flag in the log buffer is set waiting for grant, and a possible state change to P when the grant is received.

When a checkpoint is inserted in the current sliding window, if this is the third checkpoint in the current sliding window, check for all I/O operations between the first two checkpoints in the current sliding window. If there is no conflict and all acknowledges (ACKs) and ownership have been received, commit the transaction containing all I/Os between the two checkpoints, slide down the window, and send a commit transaction signal to the remote site so that the remote site can flush its Log Buffer #2 and conflict/race log if any. If there are pending acknowledges and grants of ownership, collect all them and put in commit condition buffer and set timer.

If a request for ownership is received from the remote site, search the sliding window for a match. If f there is a match, a conflict occurs, and either of the following cases applies. In case 1 where the matched I/O in the window is a write-P, send an ACK to the remote site, and log the event and data in the conflict/race log. In case 2 where the matched I/O in the window is a read-P, i) log the event and store the to-be-updated data block in Log Buffer #2, ii) change block date from P to S, and iii) send an ACK to the remote site. If there is no match, no conflict is identified as yet. In this case, log the event and store the to-be-updated data in Log Buffer #2, change the block state from P to S, and send an ACK to the remote site.

If an update request is received from the remote site, search the sliding window for a match. If there is a match, then a conflict occurs. For an interleaved conflict, let one proceed and another abort (one side may, for example, be designated as master and the other as slave). When a match occurs either of two cases apply. In case 1, the matched I/O in the window is a write-S, an ownership request was sent and not granted. In case 2, the matched I/O in the window is a read-S. In case 2, if there is an ownership request that is not granted, send a NAK and set the deadlock flag, update in place, create a snapshot, and journal the request in Log Buffer #2. If no match is found, update in place, copy on write, journal the update, and send an ACK.

Cache is updated upon commit and abort. A commit may be triggered by checkpoint maturity, or receiving all acknowledgements and grants in the commit condition buffer. An abort may be triggered by a NAK, or a time out.

The performance of SWEET protocol of certain embodiments of the invention were compared with existing invalidate protocol and a simple update protocol. The analysis is based on the following assumptions: Let SW denote the size of the sliding window in terms of number of disk operations. The window size is assumed to be $$SW = 2 * L_{WAN} / \text{I/O\_Time}$$

where LWAN is the WAN latency and I/O_Time is the disk access time. WAN latency includes propagation delay between the two data centers and the data transmission delay of a data block. Typical propagation delay is $3*10^8$ m/s and about ⅔ slowdown over copper/fiber links is observed. For 100 km to 6000 km delays of approximately 0.5 ms to 30 ms exist. Data transmission delay for 8 KB block over OC3 (150 Mbps) is about 1/300 ms. The throughput is defined as I/Os per second and denoted by Thr. The degree of sharing, s, is assumed to be 1% within 1 second interval.

To provide a realistic performance evaluation, an experiment was carried out to measure the key parameters used in the performance analysis. A benchmark such as TPC-C was run on a Postgres database for 2 hours using iSCSI protocol. While running the benchmarks, the statistics were measured at block level. The measured data are shown below in Table 1.

TABLE 1

| Parameter | Determined Value |
| --- | --- |
| Total I/Os | 497,301 + 56,167 = 553,468 |
| Update Count | 497,301 |
| Invalidate Count | 318,947 |
| Miss Count | 22,769 |
| Average Parity size | 523,496/497,301 = 1.05 kb |
| Block size | 8 kb |

The update count is the number of write operations. The invalidate count is the number of first writes to data blocks, i.e., excluding over write operations. Invalidation is necessary only upon the first write to a block. Once the copy of the block on the other storage is invalidated, following overwrites do not need to send invalidation any more. The miss count is the number of disk operations that found requested block not present in local storage. This happens because of invalidation of data blocks due to remote write operations. Requested blocks have to be transferred over the WAN network.

Considering the performance of invalidate-based coherence protocol, it is interesting to derive the effective I/O time taking into account of misses and coherence operations. Let Effective_I/O_Time denote this effective I/O time. Whenever there is a miss or invalidation is necessary, data traffic over WAN network is needed. Suppose that total WAN delay is $L_{WAN}$. Then the Effective_I/O_Time is given by $$\text{I/O\_Time} + (\text{Invalid\_Rate} + \text{Miss\_Rate}) * 2 * L_{WAN}$$

Which equals:

$$\text{I/O\_Time} + (318{,}947/553{,}468 + 22{,}769/553{,}468) * 2 * L_{WAN}$$

For updated based protocol, no misses occur because data are not invalidated but updated upon write operations at remote site. Therefore, the effective I/O time is given by $$\text{I/O\_Time} + (\text{Update\_Rate}) * 2 * L_{WAN} = \text{I/O\_Time} + (497{,}301/553{,}468) * 2 * L_{WAN}$$

For SWEET Protocol, I/O operations proceed as if no WAN operations are needed. When conflict does occur, the transaction inside the sliding window will be aborted and restart again sequentially among the two storage sites. The probability of such conflict is the degree of sharing is s. Therefore, the effective I/O time of SWEET protocol is given by $$\text{Effective\_I/O\_Time} = \text{I/O\_Time} + s * SW * \text{I/O\_Time} * 2$$

The I/O throughput is given by $$\text{Thr} = 1/\text{Effective\_I/O\_Time}.$$

Figure 4:
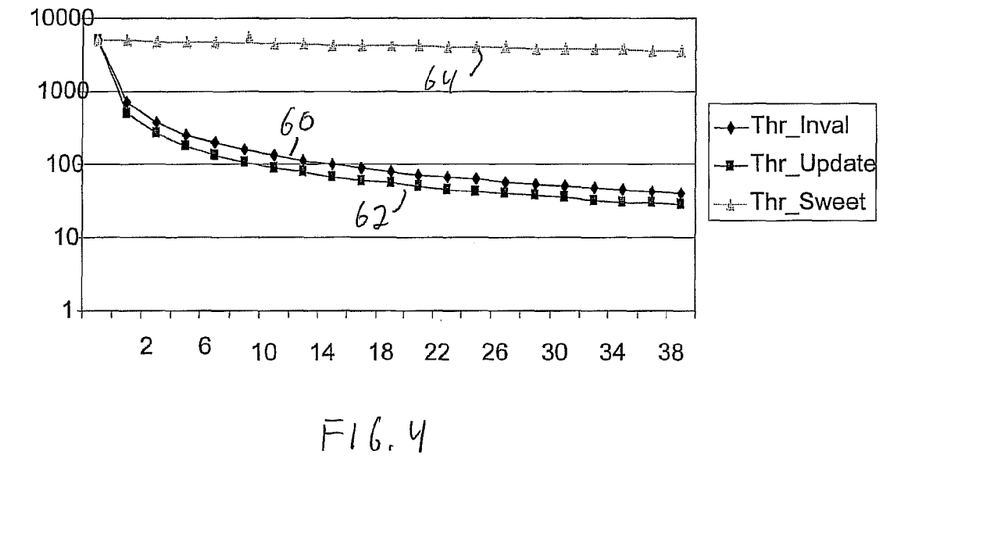
FIG. 4 shows an illustrative graphical representation of effective throughputs of three protocols for an I/O access time of 200 microseconds.

FIG. 4 shows the performances of the three protocols assuming I/O time of 200 microseconds. The throughput for conventional invalidate protocol at this I/O time is shown at 60, the throughput for conventional update protocol is shown at 62, and the throughput for a SWEET protocol of an embodiment of the invention is shown at 64. It can be seen from FIG. 4 that SWEET protocol dramatically improves the performance assuming an I/O time of 200 ms.

Figure 5:
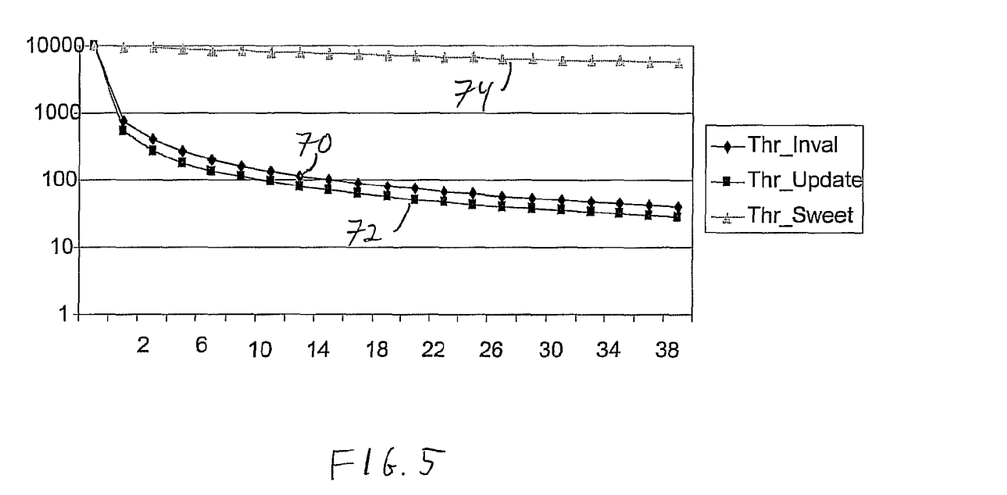
FIG. 5 shows an illustrative graphical representation of effective throughputs of three protocols for an I/O access time of 100 microseconds.

FIG. 5 shows the performances of the three protocols assuming I/O time of 100 ms. The throughput for conventional invalidate protocol at this I/O time is shown at 70, the throughput for conventional update protocol is shown at 72, and the throughput for a SWEET protocol of an embodiment of the invention is shown at 74. It can be seen from FIG. 5 that SWEET protocol dramatically improves the performance assuming an I/O time of 100 ms.

Figure 6:
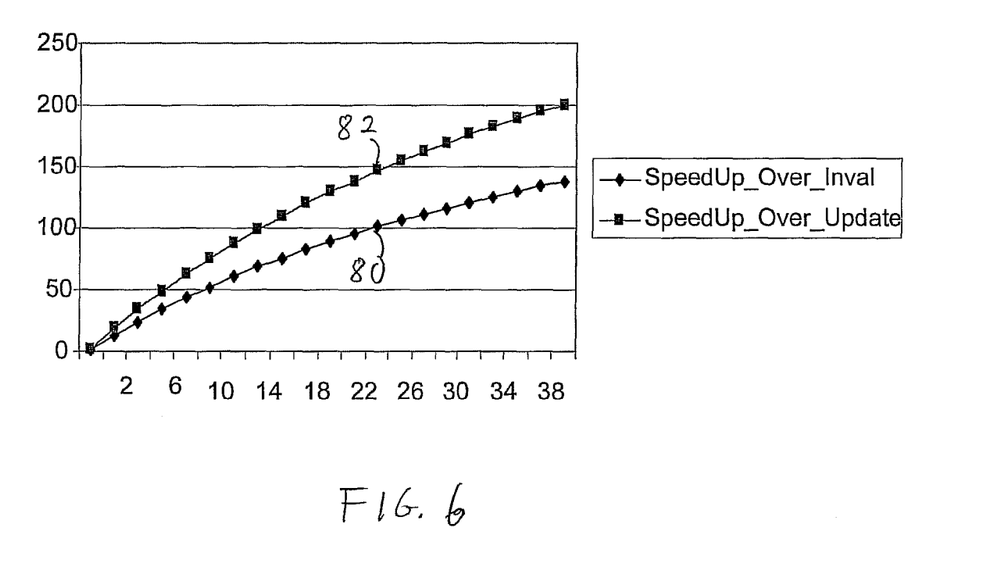
FIG. 6 shows an illustrative graphical representation of increased speed of a protocol of a system in accordance with an embodiment of the invention for an I/O time of 0.2 ms.

FIG. 6 shows the actual speed up as compared to the other two protocols as a function of WAN latency. As shown at 80 the increased speed over the conventional invalidate protocol improves with WAN latency, and as shown at 82, the increased speed over the conventional update protocol also improves with WAN latency. The speedup, in fact, increases as high as 2 orders of magnitudes as WAN latency increases. With innovations of I/O architectures such as RAID and large caches, I/O times have been improving. A benefit of the SWEET protocol increases with this technology trend, i.e., it shows better performance for higher speed I/O systems.

Those skilled in the art will appreciate that numerous modifications and variations may be made to the above disclosed embodiments without departing from the spirit and scope of the invention.

What is claimed is:

1. A system for maintaining a plurality of data storages coherent with one another for redundancy purposes, said system comprising:
    a first data storage system coupled to a first transaction processor for handling input and output transactions, and coupled to a wide area network;
    a second data storage system coupled to a second transaction processor for handling input and output transactions, and coupled to the wide area network;
    said first transaction processor permitting a first data write transaction to occur with respect to data within the first data storage system;
    said second transaction processor permitting a second data write transaction to occur with respect to data within the second data storage system;
    said first transaction processor permitting the second data write transaction to occur with respect to data within the first data storage system only upon data consistency between the first and second data storage systems being validated wherein the first data write transaction and the second data write transaction are defined by a sliding window of input/output operations; and
    said second transaction processor permitting the first data write transaction to occur with respect to data within the second data storage system only upon data consistency between the first and second data storage systems being validated.

2. The system as claimed in claim 1, wherein each of the first data write transaction and the second data write transaction includes multiple write input/output operations.

3. The system as claimed in claim 1, wherein the sliding window is defined by a plurality of checkpoints within a list of input/output operations.

4. The system as claimed in claim 1, wherein the sliding window of operations defines a third set of write input/output operations when the first transaction processor permits the second data write transaction to occur with respect to data within the first data storage system.

5. The system as claimed in claim 1, wherein a micro-snapshot of copy-on-write data for each of the first and second data write transactions is stored for a current sliding window.

6. The system as claimed in claim 5, wherein the micro-snapshot is flushed when data consistency is confirmed between the first and second data storage systems being validated.

7. The system as claimed in claim 5, wherein the micro-snapshot is restored when data consistency is not confirmed between the first and second data storage systems being validated.

8. A method of maintaining a plurality of data storages coherent with one another for redundancy purposes, said method comprising the steps of:
    maintaining a first set of data within a first data storage system that is coupled to a wide area network;
    maintaining a second set of data within a second data storage system that is coupled to the wide area network;
    permitting a first data write transaction to occur with respect to data within the first data storage system;
    permitting a second data write transaction to occur with respect to data within the second data storage system;
    executing the second data write transaction with respect to data within the first data storage system only upon data consistency between the first and second data storage systems being validated; and
    executing the first data write transaction with respect to data within the second data storage system only upon data consistency between the first and second data storage systems being validated wherein the first data write transaction and the second data write transaction are defined by a sliding window of input/output operations.

9. The method as claimed in claim 8, wherein each of the first data write transaction and the second data write transaction includes multiple write input/output operations.

10. The method as claimed in claim 8, wherein the method further includes the step of defining the sliding window by a plurality of checkpoints within a list of input/output operations.

11. The method as claimed in claim 8, wherein the method further includes the step of defining the sliding window of operations by a third set of write input/output operations when a first transaction processor coupled to the first data storage system permits the second data write transaction to occur with respect to data within the first data storage system.

12. The method as claimed in claim 8, wherein the method further includes the step of storing a micro-snapshot of copy-on-write data for each of the first and second data write transactions for a current sliding window.

13. The method as claimed in claim 12, wherein the method further includes the step of flushing the micro-snapshot when data consistency is confirmed between the first and second data storage systems being validated.

14. The method as claimed in claim 12, wherein the method further includes the step of restoring the micro-snapshot when data consistency is not confirmed between the first and second data storage systems being validated.

15. A method of maintaining a plurality of data storages coherent with one another for redundancy purposes, said method comprising the steps of:
    maintaining a first set of data within a first data storage system that is coupled to a first transaction processor for handling input and output transactions, and is coupled to a wide area network;
    maintaining a second set of data within a second data storage system that is coupled to a second transaction processor for handling input and output transactions, and is coupled to the wide area network;

permitting a first window of first data write operations to occur with respect to data within the first data storage system;

permitting a second window of second data write operations to occur with respect to data within the second data storage system;

executing the second data write operations with respect to data within the first data storage system only upon data consistency between the first and second data storage systems being validated;

executing the first data write operations with respect to data within the second data storage system only upon data consistency between the first and second data storage systems being validated;

re-defining the first window of first data write operations to include a third set of data write operations with respect to data within the first data storage system when the second transaction processor permits the first data write operations to occur with respect to data within the second data storage system;

re-defining the second window of second data write operations to include a fourth set of data write operations with respect to data within the second data storage system when the first transaction processor permits the second data write operations to occur with respect to data within the first data storage system; and wherein the method further includes the step of storing a micro-snapshot of copy-on-write data for each of the first and second data write operations for a current sliding window.

16. The method as claimed in claim 15, wherein the method further includes the step of flushing the micro-snapshot when data consistency is confirmed between the first and second data storage systems being validated.

17. The method as claimed in claim 15, wherein the method further includes the step of restoring the micro-snapshot when data consistency is not confirmed between the first and second data storage systems being validated.

* * * * *

UNITED STATES PATENT AND TRADEMARK OFFICE
CERTIFICATE OF CORRECTION

| | | |
|---|---|---|
| PATENT NO. | : 8,140,772 B1 | Page 1 of 5 |
| APPLICATION NO. | : 12/262260 | |
| DATED | : March 20, 2012 | |
| INVENTOR(S) | : Yang | |

It is certified that error appears in the above-identified patent and that said Letters Patent is hereby corrected as shown below:

Title page showing figure should be deleted and substitute the title page showing figure as attached.

Replace sheets 1-3 of the drawings with the attached sheets 1-3.

In column 2, line 10, delete "minor" and replace with "mirror".

In column 2, line 42, delete "Vandat" and replace with "Vahdat".

Signed and Sealed this
Twenty-ninth Day of May, 2012

David J. Kappos
*Director of the United States Patent and Trademark Office*

(12) United States Patent
Yang (10) Patent No.: US 8,140,772 B1
(45) Date of Patent: Mar. 20, 2012

(54) SYSTEM AND METHOD FOR MAINTAINING REDUNDANT STORAGES COHERENT USING SLIDING WINDOWS OF EAGER EXECUTION TRANSACTIONS

(75) Inventor: Qing K. Yang, Saunderstown, RI (US)

(73) Assignee: Board of Governors for Higher Education, State of Rhode Island and Providence Plantations, Providence, RI (US)

(*) Notice: Subject to any disclaimer, the term of this patent is extended or adjusted under 35 U.S.C. 154(b) by 563 days.

(21) Appl. No.: 12/262,260

(22) Filed: Oct. 31, 2008

Related U.S. Application Data (60) Provisional application No. 60/985,759, filed on Nov. 6, 2007.

(51) Int. Cl.
*G06F 15/167* (2006.01)
*G06F 12/00* (2006.01)

(52) U.S. Cl. ........ 711/141; 709/216; 711/112; 711/162

(58) Field of Classification Search ............... 709/216; 711/112, 141, 162
See application file for complete search history.

(56) References Cited

U.S. PATENT DOCUMENTS

| | | | |
|---|---|---|---|
| 7,017,012 B2 * | 3/2006 | Clarke et al. | 711/141 |
| 2003/0236950 A1 * | 12/2003 | Clarke et al. | 711/144 |
| 2006/0031450 A1 | 2/2006 | Unrau et al. | |
| 2006/0136685 A1 * | 6/2006 | Griv et al. | 711/162 |

OTHER PUBLICATIONS

Silicon Graphics, Inc. and Yotayota, "Global Block Services for the GRID, A New Architecture from SGI and YotaYota" Computational Methods in Science and Technology, Nov. 2005, p. 75-85, Special Issue 2006.

Reidel, Eric, Spence, Susan, Veitch, Alistair, "When Local Becomes Global: An Application Study of Data Consistency in a Networked World" Proc. of the 20th IEEE Int'l Performance, Computing, and Communication Conference, (IPCC2001), Apr. 2001, 6 pgs.

Keeton, Kimberly, Santos, Cipriano, Beyer, Dirk, Chase, Jeffrey, Wilkes, John, "Designing for Disasters" Hewlett-Packard Laboratories, 2004 14pgs.

(Continued)

*Primary Examiner* — Kevin Ellis
*Assistant Examiner* — Mehdi Namazi
(74) *Attorney, Agent, or Firm* — Gesmer Updegrove LLP (57) ABSTRACT

A system and method are disclosed for maintaining a plurality of data storages coherent with one another for redundancy purposes. The system includes a first data storage system and a second data storage system. The first data storage system is coupled to a first transaction processor for handling input and output transactions, and is coupled to a wide area network. The second data storage system is coupled to a second transaction processor for handling input and output transactions, and is coupled to the wide area network. The first transaction processor permits a first data write transaction to occur with respect to data within the first data storage system, and the second transaction processor permits a second data write transaction to occur with respect to data within the second data storage system. The first transaction processor permits the second data write transaction to occur with respect to data within the first data storage system only upon data consistency between the first and second data storage systems being validated. The second transaction processor permits the first data write transaction to occur with respect to data within the second data storage system only upon data consistency between the first and second data storage systems being validated.

17 Claims, 4 Drawing Sheets